(12) United States Patent
Chen et al.

(10) Patent No.: US 11,029,981 B2
(45) Date of Patent: *Jun. 8, 2021

(54) TEXT RESOURCES PROCESSING IN AN APPLICATION

(71) Applicant: International Business Machines Corporation, Armonk, NY (US)

(72) Inventors: Dong Chen, Beijing (CN); Shao Jun Ding, Beijing (CN); Zhi Li Guan, Beijing (CN); Yang Liang, Beijing (CN); Ting Yin, Beijing (CN); Wu Mi Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,184

(22) Filed: Apr. 15, 2020

(65) Prior Publication Data
US 2020/0241898 A1    Jul. 30, 2020

Related U.S. Application Data

(63) Continuation of application No. 15/396,948, filed on Jan. 3, 2017, now Pat. No. 10,691,474.

(51) Int. Cl.
*G06F 40/143* (2020.01)
*G06F 9/451* (2018.01)
*G06F 8/38* (2018.01)
*G06F 40/14* (2020.01)

(52) U.S. Cl.
CPC .............. *G06F 9/454* (2018.02); *G06F 8/38* (2013.01); *G06F 40/143* (2020.01); *G06F 40/14* (2020.01)

(58) Field of Classification Search
CPC . G06F 9/454; G06F 8/38; G06F 40/14; G06F 40/143
See application file for complete search history.

(56) References Cited

U.S. PATENT DOCUMENTS

| 8,261,295 B1 | 9/2012 | Risbood et al. |
| 9,026,994 B2 | 5/2015 | Zhang et al. |
| 9,081,769 B2 | 7/2015 | Liu et al. |
| (Continued) | | |

OTHER PUBLICATIONS

Ultan O'Broin, "Every Word Counts: Translating the Oracle Applications Cloud User Experience", Sep. 7, 2015, 6 pages.

(Continued)

*Primary Examiner* — Keith D Bloomquist
(74) *Attorney, Agent, or Firm* — Nicholas D. Bowman; Maxine L. Barasch; Keohane & D'Alessandro, PLLC

(57) ABSTRACT

Embodiments of the present disclosure relate to text resources in an application. According to a method, an updated application is run, wherein information displayed on at least one text resource in the updated application is editable and the information displayed on at least one text resource in an original application of the updated application is not editable. Then, in response to a first piece of information displayed on a text resource of the at least one text resource being changed to a second piece of information, ID of the text resource of the at least one text resource in the updated application is obtained; and the second piece of information is mapped to the ID of the text resource in a file corresponding to the at least one text resource in the updated application.

20 Claims, 6 Drawing Sheets

(56) References Cited

U.S. PATENT DOCUMENTS

| | | |
|---|---|---|
| 9,229,738 B2 | 1/2016 | Biazetti et al. |
| 9,235,569 B1 | 1/2016 | Wu et al. |
| 9,292,271 B2 | 3/2016 | Ross |
| 9,400,784 B2 | 7/2016 | Lerum et al. |
| 2004/0128614 A1 | 7/2004 | Andrews et al. |
| 2007/0233647 A1 | 10/2007 | Rawat et al. |
| 2008/0295009 A1* | 11/2008 | Huang .................... G06F 9/454 715/764 |
| 2009/0037830 A1 | 2/2009 | Kulkarni et al. |
| 2010/0115424 A1 | 5/2010 | Young et al. |
| 2012/0167041 A1* | 6/2012 | Payzer ................ G06F 21/6209 717/113 |
| 2015/0154181 A1 | 6/2015 | Dmytryshyn |
| 2016/0098261 A1 | 4/2016 | Habib et al. |
| 2018/0188914 A1 | 7/2018 | Chen et al. |

OTHER PUBLICATIONS

Richard M. Russell, USPTO Office Action, U.S. Appl. No. 15/396,948, Notification dated Aug. 7, 2018, 27 pages.
Richard M. Russell, USPTO Final Office Action, U.S. Appl. No. 15/396,948, Notification dated Feb. 26, 2019, 19 pages.
Keith D. Bloomquist, USPTO Office Action, U.S. Appl. No. 15/396,948, Notification dated Sep. 4, 2019, 10 pages.
Keith D. Bloomquist, USPTO Notice of Allowance, U.S. Appl. No. 15/396,948, dated Feb. 13, 2020, 5 pages.
Appendix P, "List of IBM Patents or Patent Applications Treated as Related", 2 pages.

\* cited by examiner

Fig 3

```
<?xml version="1.0" encoding="UTF-8"?>
- <resources>
    <string name="sample_button">Submit</string>
    <string name="sample_label1 ">Name:</string>
    <string name="sample_label2 ">Mail Address:</string>
    <string name="sample_hint">Email Address</string>
</resources>
```

Fig. 4

```
<?xml version="1.0" encoding="UTF-8"?>
- <resources>
    <string name="sample_button">提交</string>
    <string name="sample_label1 ">姓名:</string>
    <string name="sample_label2 ">邮寄地址:</string>
    <string name="sample_hint">邮件地址</string>
</resources>
```

Fig. 5

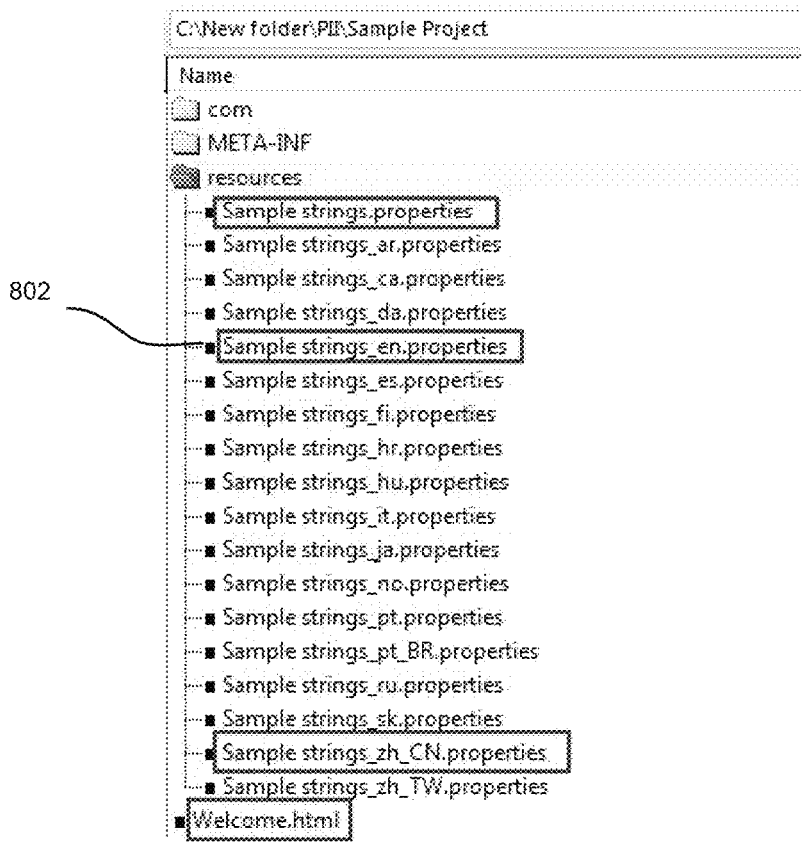

Fig. 8

```
Sample strings_en.properties - Notepad
File  Edit  Format  View  Help
##############################################
# File Name    = Sample English Source.properties
# Description  = Strings used by Sample UI

# Format of this property file:
#   left hand side  - key   (do not translate)
#   right hand side - value (text to be translated)

######################################## start NLS_MESSAGEFORMAT_VAR
NLS_ENCODING=UNICODE

Sample_Button
Sample_Label1
Sample_Label2
Sample_Hint
```

Fig. 9

TEXT RESOURCES PROCESSING IN AN APPLICATION

CROSS-REFERENCE TO RELATED APPLICATIONS

The present patent document is a continuation of U.S. patent application Ser. No. 15/396,948, filed Jan. 3, 2017, entitled "TEXT RESOURCES PROCESSING IN AN APPLICATION", the disclosure of which is incorporated herein by reference.

FIELD OF THE INVENTION

The present disclosure relates to the field of information processing technology, and more specifically, to text resources processing in an application.

BACKGROUND

A product may comprise at least one application. During development of the product, text resources in applications of the product usually need to be displayed in multiple languages. This is referred to as "globalization" or National Language Support (NLS) by programmers. Text resources include, but are not limited to, the following resources: checkbox, menu, popup, panel, text field, table, title, link, widget, window, frame, dialogue, applet, message, hint, tooltips, option, button, label, form, etc. Text information will be displayed on these resources, so they are referred to herein as text resources. Application, as used herein, means an application program which can be run in a specific environment. In current implementations of a product globalization development, developers often package all text resources into a language resource file and then send the language resource file to a translator. The language resource file comprises an ID of each text resource and information to be displayed on each text resource in an original language. The information to be displayed on each text resource in the original language needs to be translated into other languages by the translator. After translation, the translator returns the NLS source file, which comprises all the IDs of the text resources and the translation of the information in another language as requested, to the developer or a tester. Thereby the developer or the tester can check-in the NLS source file for the product, and review the translated information displayed on the text resource, either by running the product after the product is built and deployed, or by taking screen captures sent to testers, to check correctness of the translation in the product.

SUMMARY

Example embodiments of the present disclosure provide a method, a device, and a computer program product for text resources globalization in an application.

In an aspect, a computer-implemented method is provided. According to the method, an updated application is run, wherein information displayed on at least one text resource in the updated application is editable and the information displayed on at least one text resource in an original application of the updated application is not editable. Then, in response to a first piece of information displayed on a text resource of the at least one text resource being changed to a second piece of information, an ID of the text resource of the at least one text resource in the updated application is obtained, and then the second piece of information is mapped to the ID of the text resource in a file corresponding to the at least one text resource in the updated application.

In another aspect, a device is provided. The device includes a processing unit and a memory coupled to the processing unit and storing instructions thereon. The instructions can be executed by the processing unit to perform acts including: running an updated application, wherein information displayed on at least one text resource in the updated application is editable and the information displayed on at least one text resource in an original application of the updated application is not editable; in response to a first piece of information displayed on a text resource of the at least one text resource being changed to a second piece of information, obtaining ID of the text resource of the at least one text resource in the updated application; and mapping the second piece of information to the ID of the text resource in a file corresponding to the at least one text resource in the updated application.

In yet another aspect, a computer program product is provided. The computer program product is tangibly stored on a non-transient machine-readable medium and comprises machine-executable instructions. When executed on a device, the instructions cause the device to run an updated application, wherein information displayed on at least one text resource in the updated application is editable and the information displayed on at least one text resource in an original application of the updated application is not editable; in response to a first piece of information displayed on a text resource of the at least one text resource being changed to a second piece of information, obtain ID of the text resource of the at least one text resource in the updated application; and map the second piece of information to the ID of the text resource in a file corresponding to the at least one text resource in the updated application.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 3 is another exemplary user interface (UI) 300 of an application in which embodiments of the present disclosure can be applied;

FIG. 4 is an exemplary language resource file of UI 200 or UI 300 in xml format;

FIG. 5 is an exemplary NLS resource file for Chinese translation for UI 200 and UI 300 in xml format

FIG. 8 shows exemplary resources included in the source code of the application comprising UI 200 or UI 300;

FIG. 9 shows the content in the file named "Sample string properties" in FIG. 8;

Throughout the drawings, the same or similar reference numerals represent the same or similar elements.

DETAILED DESCRIPTION

The principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
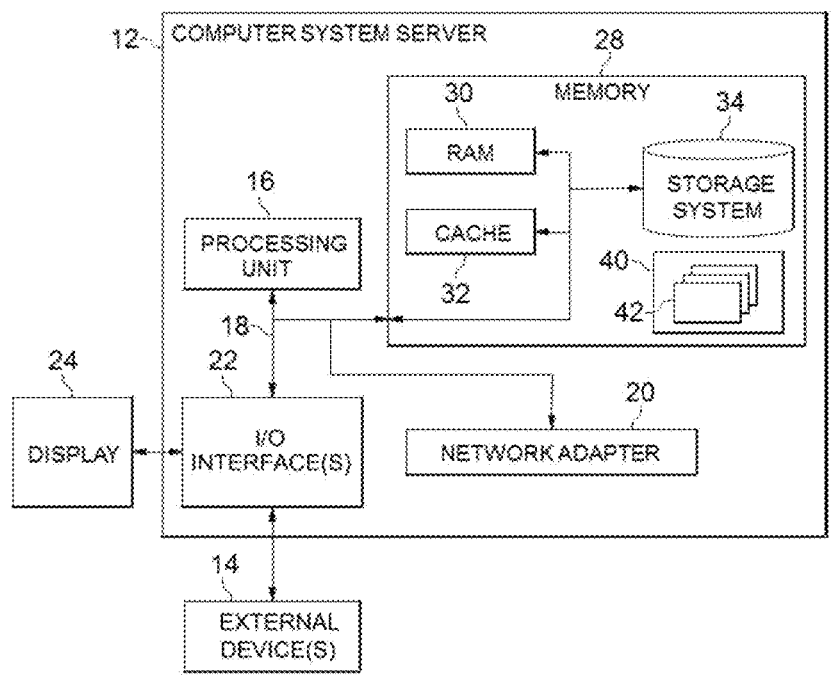
FIG. 1 is a block diagram of an electronic device suitable for implementing embodiments of the present disclosure.

Reference is first made to FIG. 1, in which an exemplary electronic device or computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

In current implementations of product globalization development, NLS source files are separated from user interface (UI) of applications in the product. They are verified alone. If an error in the translation is found, the error has to be returned to the translator for correction. After the translator corrects the errors in the NLS file and returns the updated NLS source file, the developer or the tester has to check-in the updated NLS source file, build and deploy the product again. Then either of them can view the translated information displayed on the text resource. So any translation correction needs to go back to translators. And programmers need to get updated NLS source file from the translators, check-in the updated NLS source file, build and deploy the product, and then verify the translation from the UI.

The implementation leads to duplicate efforts and impacts the quality, as the globalization engineer (including translators, programmers and testers) can't actually see the changes he/she made directly. It is also time consuming.

An improved method, system and program product for text resources globalization in an application is provided according to embodiments of the present invention in which translators can translate text resources in the context of the application, and programmers or testers can actually see the changes they made.

Figure 2:
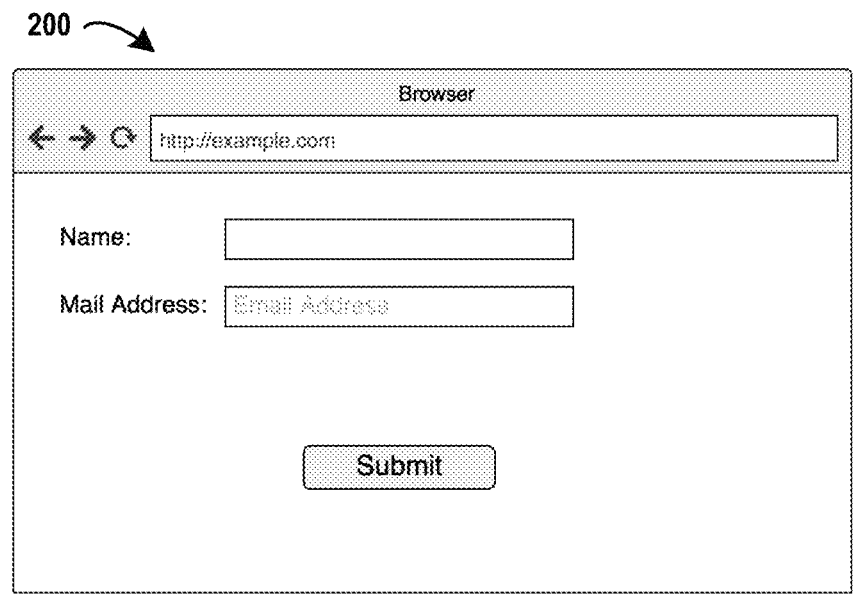
FIG. 2 is an exemplary user interface (UI) 200 of an application in which embodiments of the present disclosure can be applied.

FIG. 2 is an exemplary user interface (UI) 200 of an application in which embodiments of the present disclosure can be applied. The UI 200 is a web browser UI whose source code is based on JavaScript and HTML. In the example, the default language of the UI 200 is English, so the information displayed on text resources of UI 200 is in English, but it needs to be translated into other languages, such as Chinese, to satisfy the NLS requirement. In FIG. 2, the four pieces of information displayed on four text resources in the original language are "Name", "Mail address", "Email address", and "Submit" respectively. From FIG. 2, it can be understood that the information displayed on the four text resources in original language on UI 200 cannot be edited.

FIG. 3 is another exemplary user interface (UI) 300 of an application in which embodiments of the present disclosure can be applied. The UI 300 is not a web browser UI, but instead a Java-based UI. The default language of the UI 300 is English. The information displayed on text resources of UI 300 is in English and needs to be translated into other languages, such as Chinese, to satisfy the NLS requirement. In FIG. 3, the information displayed on each of the four text resources in original language is "Name", "Mail address" (two instances), "Email address", and "Submit" respectively. From FIG. 3, it can be understood that the information displayed on the four text resources in original language on UI 300 cannot be edited.

An exemplary language resource file of the UI 200 or the UI 300 in xml format is shown in FIG. 4. In the language resource file, it can be seen that the four text resource IDs are sample button, sample_label1, sample_label2, and sample_hint respectively, and four pieces of information displayed on the four text resources in original language are Submit, Name:, Mail address:, and Email address respectively.

When the displayed information on UI 200 or UI 300 needs to be translated into Chinese, FIG. 5 is an exemplary NLS resource file for Chinese translation for UI 200 and UI 300 in xml format.

If the information displayed on the text resources on UI 200 or UI 300 were editable, a programmer or a tester would be able to make a change to the information displayed on the text resource when viewing the product UI or screen-capture, so as to modify translation errors in NLS file.

Figure 6:
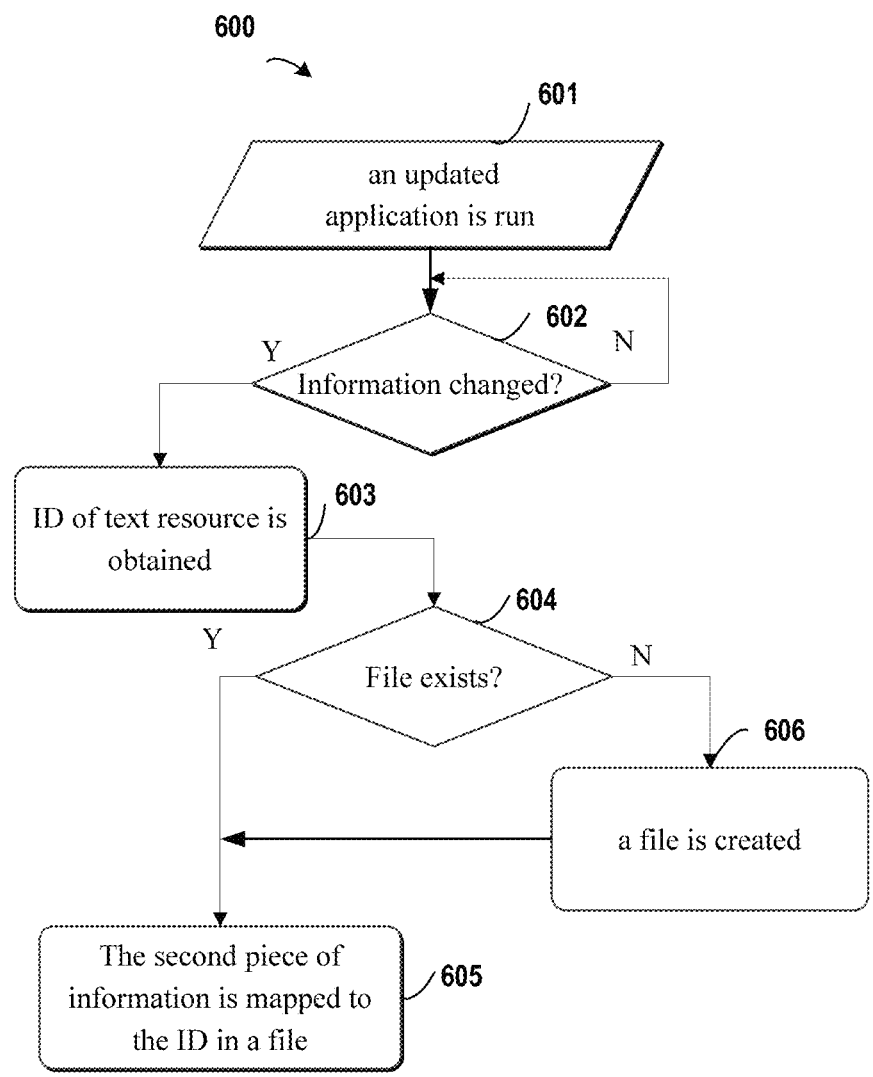
FIG. 6 is a flowchart of a method for text resources globalization in an updated application in accordance with embodiments of the present disclosure.

FIG. 6 is a flowchart of a method 600 for text resources globalization in an updated application in accordance with embodiments of the present disclosure. In some embodiments, the method 600 can be a plug-in of a development tool running on a machine. As used herein, the term "machine" may refer to a physical machine, a virtual machine (VM) or any other suitable computing platform. The development tool can read the source code of an application with at least one UI, such as UI 200 and UI 300, and build, deploy and then run the application.

Referring to FIG. 6, in step 601, an updated application is run, wherein information displayed on at least one text resource in the updated application is editable and information displayed on at least one text resource in an original application of the updated application is not editable. Here the original application and the updated application can be regarded as same application in different versions, e.g. a text resource in the original application has a corresponding text resource in the updated application. And here information displayed on the at least one text resource in the application is supposed to be editable, and the method on how to make it editable is described herein. In step 602, it is determined whether a first piece of information displayed on a text resource is changed to a second piece of information. If yes, the process proceeds to step 603, where an ID of the text resource is obtained. In step 604, it is determined whether a file corresponding to the at least one text resource in the updated application exists. If yes, then in step 605, the second piece of information is mapped to the ID of the text resource in the file corresponding to the at least one text resource in the updated application. If not, then in step 606, the file is created, and the process proceeds to step 605. This process can apply to multiple text resources within a user interface. Also note, that here the execution sequence of the step 602 and the step 603 can be exchanged, e.g the ID of the text resource can be obtained before the determining step 602.

In the above embodiment, if the file exists, it can be known that translators have made translation for the text resource. If a programmers or a tester finds a translation error when reviewing the product UI, he/she can make a change to the file via the UI at any time and the change can be effective at once. Thus there is no need to go back to the translators. This method can save the time of the programmers or the testers. Additionally, in the above embodiment, if the file does not exist, the file can be created at step 606, so the translators can then make a translation for the text resources. Using the method, the translator can get the context of a text resource so as to make the translation more correct to reduce the burden of programmers and testers.

In the method 600, the information displayed on at least one text resource in the updated application is required to be editable so that translators, programmers or testers can input or change translation of the information in a context of a text resource. In accordance with embodiments of the present disclosure, programmers can write source code of an application to make text resources editable in the application. In one embodiment, he/she can write a source code with editable text resource component, and then when the application is run, the text resource is shown to be edited.

However, when an application is released, it is required that all information displayed on text resources should not be edited. So in another alternative embodiment, the programmer may set a variable identifier in the source code of the application. If the variable identifier is a first value, the text resources in the source code of the application cannot be edited; if the variable identifier is a second value, the text resources in the source code of the application can be edited. The variable identifier can be enabled from the UI by the user so that when the updated source code is built, deployed to get an updated application, the text resources in the UI of the updated application can be enabled to be edited or not.

Figure 7:
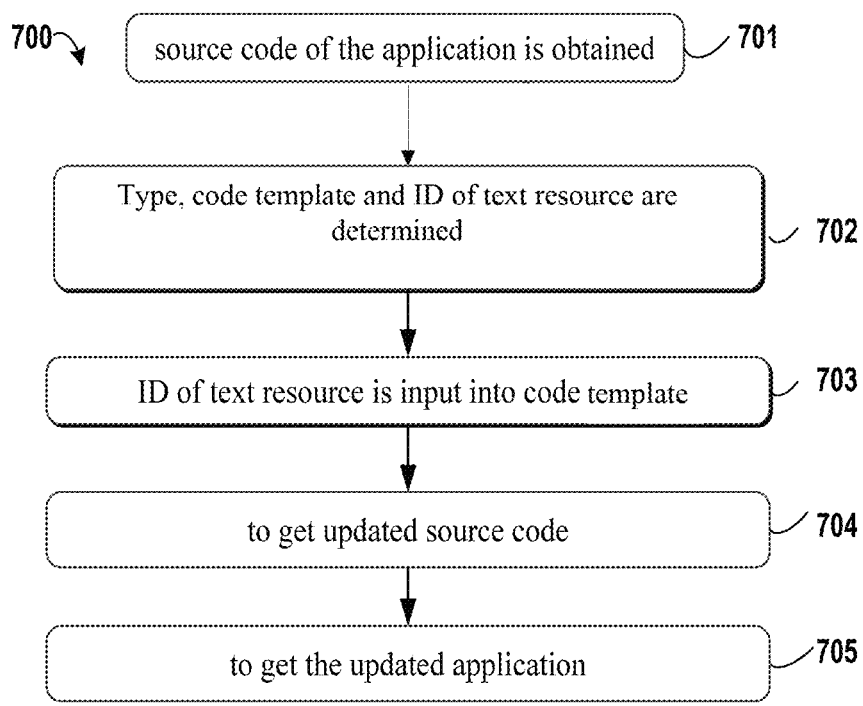
FIG. 7 is a flowchart of the method for changing source code of an application to make information displayed on at least one text resource in the application editable.

Function of enabling the information displayed on at least one text resource in the application to be edited when programming will cost programmer extra effort. And when the application is released, the function has to be disabled by setting the variable identifier to the first value. The invention provides a method to automatically change the source code of an application to make the information displayed on at least one text resource in the application editable. In some embodiments, the method is a plug-in in a development tool. When the plug-in is initiated, the method will be executed. FIG. 7 is a flowchart of the method for changing the source code of an application to make the information displayed on at least one text resource in the application editable. According to FIG. 7, in step 701, source code of the application is obtained. In step 702, a type of the source code, an 11D of the at least one text resource, and code templates related to the type of the source code are determined. Here code templates comprise code with editable text resources according to the type of the source code. In step 703, the ID of each text resource, of the at least one text resource, is input into the code templates to get replaced templates, and in step 704, the replaced templates are added into the source code to get updated source code. In step 705, the updated source code is built, and deployed to get the updated application. In the running updated application, the information displayed on the at least one text resource in the application is editable.

For example, when the method 700 is applied to the application comprising UI 200 in FIG. 2, the following HTML code is a part of source code corresponding to the UI 200 in the application, referring as "UI 200 HTML code" in the invention.

```
<html>
<head>
</head>
<body>
<form class="form-inline" role="form">
    <label id="Sample_Label1">Name </label>
        <input type="text" class="form-control">
        <label id="Sample_Label2"> Mail Address </label>
      <input id="Sample_Hint" type="text" class="form-control" placeholder="Email Address ">
<button id="Sample_Button" >Submit</button>
</form>
</body>
</html>
```

The type of the source code can be identified from the above html code, e.g. the type of the source code is JavaScript and html. The source code of the application also includes resources. FIG. 8 shows exemplary resources included in the source code of the application comprising UI 200 or the application comprising UI 300. Since the original information of a text resource is displayed in English, FIG. 9 shows the content in the file named "Sample string_en properties" at 802 in FIG. 8. And the ID of the at least one text resource can be identified from the content of the file in FIG. 9.

And because the type of the source code is JavaScript and html, the following code template (with the help of JQuery library) for type of JavaScript and html is determined. In this invention, all code templates for all source code types have been saved in the plug-in code, which can be obtained according to the source code type.

```
<script>
var original_message = $("[id='Text resource ID']").text;
$("[id=' Text resource ID ']").replaceWith("<input id=' Text resource ID ' type='text' placeholder=$(this).original_message>");
</script>
```

The above code template is just exemplary, so it should be recognized that there are many other ways to implement it within the scope and spirit of the invention. For example, the code template (without help of JQuery library) for type of JavaScript and html can also be written as the

```
<script>
var original_message = document.body.getElementByTag("Text Resource ID").text;
document.body.getElementByTag("Text Resource ID").innerHTML="<input id=' Text resource ID ' type='text' placeholder=this.original_message>"
</script>
```

From this example, those skilled in the art can understand that there may be more than one type of code template for one source code type.

Moreover, there are four text resources in UI 200, and their text resource IDs are Sample_Label1, Sample_Label2, Sample_Button, and Sample_Hint, respectively. The four text resource IDs are obtained from the file in FIG. 9. Then the four obtained IDs of the text resources are input into the above template to get replaced templates. Following are the replaced templates for the application.

```
<script>
var original_message = $("[id='Sample_Label1']").text;
$("[id='Sample_Label1']").replaceWith("<input id='Sample_Label1' type='text' placeholder=$(this).original_message>");
original_message = $("[id='Sample_Label2']").text;
$("[id='Sample_Label1']").replaceWith("<input id='Sample_Label2' type='text' placeholder=$(this).original_message>");
original_message = $("[id='Sample_Button']").text;
$("[id='Sample_Label1']").replaceWith("<input id='Sample_Button' type='text' placeholder=$(this).original_message>");
original_message = $("[id='Sample_Hint']").text;
$("[id='Sample_Label1']").replaceWith("<input id='Sample_Hint' type='text' placeholder=$(this).original_message>");
</script>
```

The above replaced templates can be in an individual script file in the source code and a reference for the individual script file can be used in UI 200 HTML file. For example, if above replaced templates code is stored in a file named replace.js then, following code referring to this file can be used in the UI 200 HTML code as the reference.
<script src="replace.js"></script>
The above reference can be thought as part of template for the type of the source code. Then the above replaced templates code are added into the source code to get updated source code, and then the updated source code can be built, deployed to get the updated application. When the updated application is run, the information displayed on the four text resources in the application is editable.

In another example, when the method 700 is applied to the application comprising UI 300 in FIG. 3, the following Java code is part of source code corresponding to UI 300 in the application, named "UI 300 Java code" in the other part of the application.

```
public class UserLoginPage extends JFrame implements ActionListener {
    @GlobalizationAnnotation
    private JComponent lblUsername;
    @GlobalizationAnnotation
    private JComponent lblPassword;
    private JTextField tfUsername;
    private JTextField tfEmail;
    @GlobalizationAnnotation
    private JComponent btnOK;
    public UserLoginPage( ) {
//the sample label item of "Name:"
        JPanel p1 = new JPanel( );
        p1.setLayout(new BorderLayout( ));
        lblUsername = new JLabel(ResourceHelper.MSG.getMessage("Sample_Label1"));
        tfUsername = new HintTextField("");
        tfUsername.setPreferredSize(new Dimension(300,50));
        p1.add(lblUsername, BorderLayout.WEST);
        p1.add(tfUsername, BorderLayout.EAST);
        p1.setPreferredSize(new Dimension(500,50));
//the sample label item of "Mail Address"
        JPanel p2 = new JPanel( );
        p2.setLayout(new BorderLayout( ));
        lblPassword = new JLabel(ResourceHelper.MSG.getMessage("Sample_Label2"));
        p2.add(lblPassword, BorderLayout.WEST);
        p2.setPreferredSize(new Dimension(250,50));
//the sample hint item of "Email Address"
        JPanel p3 = new JPanel( );
        p3.setLayout(new BorderLayout( ));
        tfEmail = new HintTextField(ResourceHelper.MSG.getMessage("Sample_Hint"));
        tfEmail.setPreferredSize(new Dimension(250,50));
        p3.add(tfEmail, BorderLayout.WEST);
        p3.setPreferredSize(new Dimension(250,50));
    //the sample button item of "Submit"
        JPanel p4 = new JPanel( );
        btnOK = new JButton(ResourceHelper.MSG.getMessage("Sample_Button"));
        p4.add(btnOK);
        this.add(p1, BorderLayout.NORTH);
```

-continued

```
        this.add(p2, BorderLayout.WEST);
        this.add(p3, BorderLayout.EAST);
        this.add(p4, BorderLayout.SOUTH);
        this.setLocation(450, 300);
        this.setSize(500, 400);
        this.setPreferredSize(new Dimension(500, 400));
        this.setTitle("Mail Address");
        this.setDefaultCloseOperation(JFrame.EXIT_ON_CLOSE);
        this.setVisible(true);
    }
    public static void main(String[ ] args) {
        //run and display the user login page
        new UserLoginPage( );
    }
}
```

The type of the source code can be identified from the above Java code, e.g., the type of the source code is Java. Similar to FIG. 8, the source code of the application also includes resources and the original information of a text resource is similar to the content in FIG. 9. And the ID of the at least one text resource can be identified from the content of the file similar to the file in FIG. 9.

And because the type of the source code is Java, the following code template for type of Java is determined from the plug-in which stores all code templates for all types of source code.

```
if(lineTxt.indexOf("JLabel")!=-1 && messageId.equals("Text resource ID")){
    update = lineTxt.replaceAll("JLabel", "JTextField");
}
if(lineTxt.indexOf("JButton")!=-1 && messageId.equals("Text resource ID")){
    update = lineTxt.replaceAll("JButton ", "JTextField");
}
if(lineTxt.indexOf("JTextField")!=-1 && messageId.equals("Text resource ID")){
    update = lineTxt.replaceAll("JTextField ", "JTextField");
}
```

The four text resources IDs, namely Sample_Label1, Sample_Label2, Sample Button, and Sample_Hint, are obtained from the file similar to the file in FIG. 9. Then the four obtained IDs of the text resources are input into the above code template to get replaced code templates. Following are the replaced code templates.

```
if(lineTxt.indexOf("JLabel")!=-1 && messageId.equals("Sample_Label1")){
        update = lineTxt.replaceAll("JLabel", "JTextField");
    }
    if(lineTxt.indexOf("JLabel")!=-1 && messageId.equals("Sample_Label2")){
        update = lineTxt.replaceAll("JLabel", "JTextField");
    }
    if(lineTxt.indexOf("JButton")!=-1 && messageId.equals("Sample_Button")){
        update = lineTxt.replaceAll("JButton", "JTextField");
    }
    if(lineTxt.indexOf("JTextField")!=-1 && messageId.equals("Sample_Hint")){
        update = lineTxt.replaceAll("JTextField", "JTextField");
```

In this example, the following code (excluding the replaced code templates) can be thought as part of templates for the type of the source code. Then the above replaced templates code for the type of the source code are added into the application source code to get updated source code,

```
public class TransformForTranslate {
    public static void main(String[ ] args) throws IOException {
//this is just the folder of source code
        String source = "D:\\wkspc\\src\\com\\ibm\\demo\\UserLogin.java";
        String target = "D:\\wkspc\\src\\com\\ibm\\demo\\UserLoginTranslateMode.java";
```

```
            File f = new File(source);
            InputStreamReader read = new InputStreamReader(new FileInputStream(f));
            BufferedReader bufferedReader = new BufferedReader(read);
            BufferedWriter out = new BufferedWriter(new FileWriter(target));
            String lineTxt = null;
//read the java code line by line and update globalization items
            while ((lineTxt = bufferedReader.readLine( )) != null) {
                String update = lineTxt;
String messageId = getMessageId(lineTxt);
                if(lineTxt.indexOf("JLabel")!=-1 && messageId.equals("Sample_Label1")){
                    update = lineTxt.replaceAll("JLabel", "JTextField");
                }
                if(lineTxt.indexOf("JLabel")!=-1 && messageId.equals("Sample_Label2")){
                    update = lineTxt.replaceAll("JLabel", "JTextField");
                }
                if(lineTxt.indexOf("JButton")!=-1 && messageId.equals("Sample_Button")){
                    update = lineTxt.replaceAll("JButton", "JTextField");
                }
                if(lineTxt.indexOf("JTextField")!=-1 && messageId.equals("Sample_Hint")){
                    update = lineTxt.replaceAll("JTextField", "JTextField");
                }
                out.write(update);
                out.newLine( );
            }
            read.close( );
            out.flush( );
            out.close( );
        }
    }
public class UserLoginPageUpdated extends JFrame implements ActionListener {
    @GlobalizationAnnotation
    private JComponent lblUsername;
    @GlobalizationAnnotation
    private JComponent lblPassword;
    private JTextField tfUsername;
    private JTextField tfEmail;
    @GlobalizationAnnotation
    private JComponent btnOK;
    public UserLoginPageUpdated( ) {
        JPanel p1 = new JPanel( );
        p1.setLayout(new BorderLayout( ));
        lblUsername = new JTextField(ResourceHelper.MSG.getMessage("Sample_Label1"));
        tfUsername = new HintTextField("");
        tfUsername.setPreferredSize(new Dimension(300,50));
        p1.add(lblUsername, BorderLayout.WEST);
        p1.add(tfUsername, BorderLayout.EAST);
        p1.setPreferredSize(new Dimension(500,50));
        JPanel p2 = new JPanel( );
        p2.setLayout(new BorderLayout( ));
        lblPassword = new JTextField(ResourceHelper.MSG.getMessage("Sample_Label2"));
        p2.add(lblPassword, BorderLayout.WEST);
        p2.setPreferredSize(new Dimension(250,50));
        JPanel p3 = new JPanel( );
        p3.setLayout(new BorderLayout( ));
        tfEmail = new JTextField(ResourceHelper.MSG.getMessage("Sample_Hint"));
        tfEmail.setPreferredSize(new Dimension(250,50));
        p3.add(tfEmail, BorderLayout.WEST);
        p3.setPreferredSize(new Dimension(250,50));
        JPanel p4 = new JPanel( );
        btnOK = new JTextField(ResourceHelper.MSG.getMessage("Sample_Button"));
        p4.add(btnOK);
        this.add(p1, BorderLayout.NORTH);
        this.add(p2, BorderLayout.WEST);
        this.add(p3, BorderLayout.EAST);
        this.add(p4, BorderLayout.SOUTH);
        this.setLocation(450, 300);
        this.setSize(500, 400);
        this.setPreferredSize(new Dimension(500, 400));
        this.setTitle("Mail Address");
        this.setDefaultCloseOperation(JFrame.EXIT_ON_CLOSE);
        this.setVisible(true);
    }
    public static void main(String[ ] args) {
        new UserLoginPageUpdated( );
    }
}
```

Figure 10:
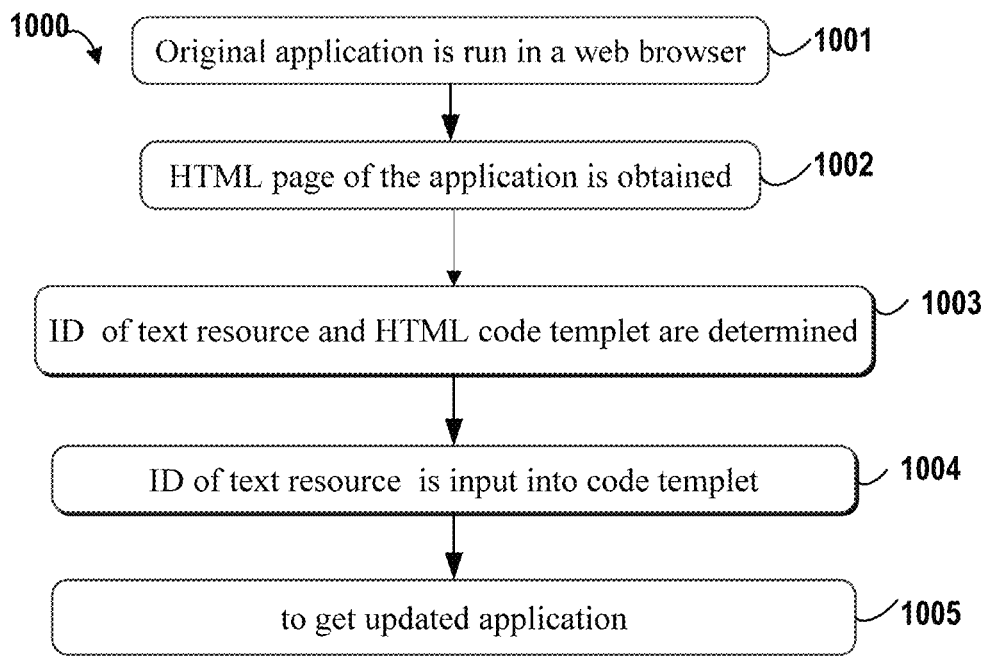
FIG. 10 is a flowchart of the method for changing html code of an application to make information displayed on at least one text resource in the application editable.

In another example, if the application is based on the web browser, i.e, it is a web application. When an application is running, a HTML web page can be obtained by the web browser, and then the above code templates can be read from the plug-in and the code replacement can be done to get updated HTML web page. Then the web browser can directly open the updated HTML web page (e.g. updated application) without rebuilding the application. FIG. 10 is a flowchart of the method for changing html code of an application to make information displayed on at least one text resource in the application editable. According to FIG. 10, in step 1001, an original application of the updated application is run in a web browser. Then in step 1002, a HTML page of the original application is obtained by the web browser. In step 1003, IDs of the at least one text resource from the HTML page and code template related to the HTML page are determined. Here code templates comprise code with editable text resources according to the type of the source code. Then in step 1004, the ID of each text resource, of the at least one text resource, is input into the code templates to get replaced templates. Then in step 1005, the replaced templates are added to the html page to get updated application which can be directly run in the web browser.

For example, when the method 1000 is applied to the application comprising UI 200 in FIG. 2, html page in the updated application is the same as the updated source code in the updated application using method 700. Here the detailed code is omitted. Using this method, in the application in FIG. 2, programmers need not build and deploy the application after changing the source code, since html page can be read by a web browser directly.

Figure 11:
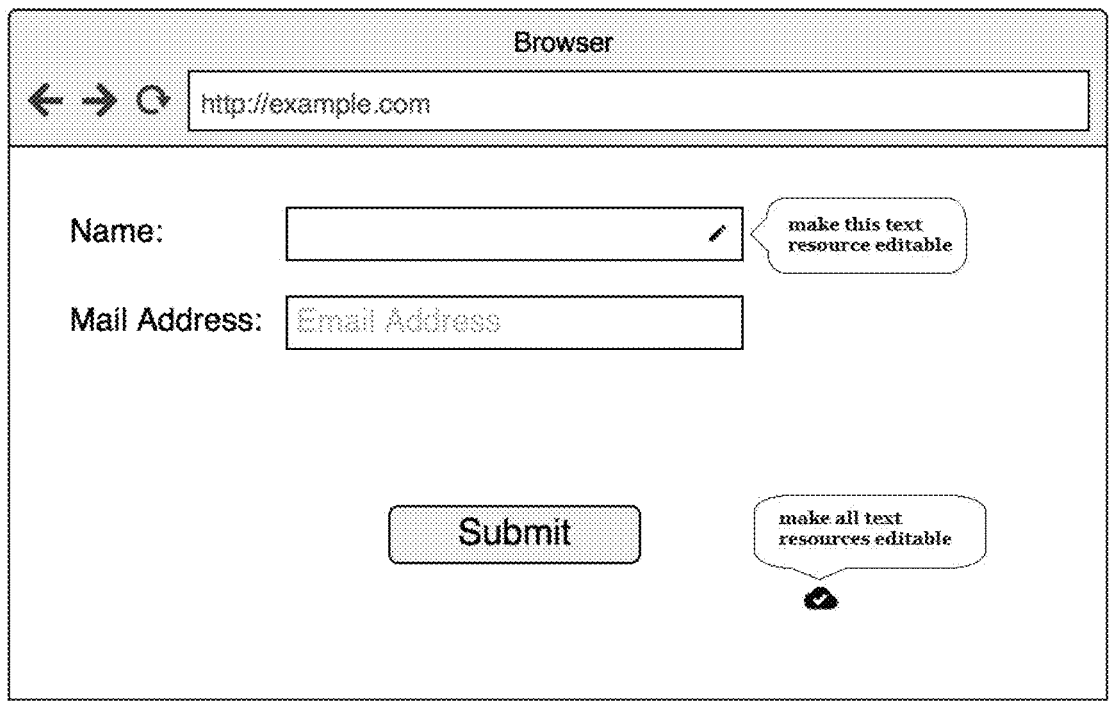
FIG. 11 is an exemplary interface of FIG. 2 with the first variable identifier and the second variable identifier corresponding to the ID of the text resource "Sample_Label1".

In some embodiments, a first variable identifier may be set in the source code of an application in method 700. If the first variable identifier is set to be "false", the text resources in the source code of the application cannot be edited, while if the variable identifier is set to be "true", the text resources in the source code of the application can be edited. The variable identifier can be enabled from UI by the user so that when the updated source code is built, deployed and run, all the text resources in the application UI can be edited or not. In some further embodiments, at least one second variable identifier may be set in the source code of an application in method 700. If the first variable identifier is set to be "false", the corresponding text resource in the source code of the application cannot be edited, while if the variable identifier is set to be "true", the corresponding text resource in the source code of the application can be edited. The variable identifier can be enabled from UI by the user so that when the updated source code is built, deployed and run, the corresponding text resources in the application UI can be edited or not. FIG. 11 is an exemplary interface of FIG. 2 with the first variable identifier and the second variable identifier corresponding to the ID of the text resource "Sample_Label1" (Name). In the FIG. 11, when a user presses the checkmark, the four text resources can be edited, and when pressing the checkmark again, the four text resources cannot be edited. Similarly, when a user presses the pen mark, the text resources with Sample_Label1 as its ID can be edited, and when the pen mark is pressed again, the text resources with Sample_Label1 as its ID cannot be edited. When a text resource is enabled to be edited, a user can input correct information or translation, etc.

In some embodiments, the checkmark in FIG. 11 can further comprise some selections for the user, for example, some selections may enable all text resources to be edited or disable all text resources to be edited, or enable the user to submit changes which means the user has finished the input for part or all text resources, and NLS file can be created or updated.

Those skilled in the art can understand that the mark used in FIG. 11 is just exemplary mark, any kind of mark can be used in this invention.

Besides the source code type of JavaScript and HTML, html or Java, other source code type, such as C/C++ code can be used in this invention. The principle and implementation are similar. Still, a template corresponding to the type of the source code and the ID of the at least one text resource are determined from the source code and the obtained IDs of the text resources are input into the templates to get replaced templates. The replaced template are added into the source code to get updated source code. At last, the updated source code is built, deployed and run.

Although idea of the invention is from text resources globalization, the method can also be used in other scenarios, for example, an application has been developed for a customer, such as a first bank, and other customers, such as other banks, have the similar requirements. The programmers can just change the information displayed on the text resources of the application to adapt the requirement of the second customer with this invention. In such scenarios, a file corresponding to the at least one text resource is not requested to be an NLS file.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
in response to initiation of a plug-in, running an updated application,
wherein information displayed on at least one text resource of a plurality of text resources in an original application of the updated application is not editable, and
wherein a subset of the plurality of text resources includes the at least one text resource;
in response to a first piece of information displayed on a text resource of the at least one text resource being changed to a second piece of information:
obtaining an ID of the text resource of the at least one text resource in the updated application; and
mapping the second piece of information to the ID of the text resource in a file corresponding to the at least one text resource in the updated application, wherein the updated application, when built, deployed and run, comprises a first variable identifier which can be enabled to make the subset of the plurality of text resources in the updated application editable from a user interface (UI) of the updated application, and further comprises a second variable identifier which can be enabled to make an entirety of the plurality of text resources in the updated application editable from the (UI) of the updated application;
obtaining source code of the original application;
in response to determining a type of the source code as a programming language, and in response to the information displayed on the at least one text resource in the original application being not editable:
determining an ID of the at least one text resource, and code templates related to the type of the source code which comprise code with editable text resources;

inputting the ID of each text resource of the at least one text resource into the code templates to produce replaced templates;

applying the replaced templates to produce updated source code;

saving the replaced templates in code of the plug-in; and building and deploying the updated source code to produce the updated application.

2. The method according to claim 1, further comprising:

in response to determining a type of the source code as a markup language, and in response to the information displayed on the at least one text resource in the original application being not editable:

determining the ID of the at least one text resource from a markup language page and code templates related to the markup language page which comprise code with editable text resources, inputting the ID of each text resource of the at least one text resource into the related code templates to produce the replaced templates, and adding the replaced templates to the markup language page to produce the updated application which can be directly run in a browser.

3. The method according to claim 2, wherein the markup language is HTML.

4. The method according to claim 1, wherein mapping the second piece of information to the ID of the text resource in a file corresponding to the at least one text resource in the updated application comprises:

creating the file in response to the file not existing.

5. The method according to claim 1, wherein the programing language is Javascript.

6. The method according to claim 1, wherein the updated application comprises a first variable identifier which can be enabled to make all the at least one text resource in the application editable from a user interface (UI) of the application.

7. The method according to claim 1, wherein the updated application comprises a second variable identifier which can be enabled to make a text resource in the application editable from a user interface (UI) of the application.

8. A device comprising:

a processing unit;

a memory coupled to the processing unit and storing instructions thereon, the instructions, when executed by the processing unit, performing acts including:

in response to initiation of a plug-in, running an updated application, wherein information displayed on at least one text resource of a plurality of text resources in an original application of the updated application is not editable, and wherein a subset of the plurality of text resources includes the at least one text resource;

in response to a first piece of information displayed on a text resource of the at least one text resource being changed to a second piece of information:

obtaining an ID of the text resource of the at least one text resource in the updated application; and mapping the second piece of information to the ID of the text resource in a file corresponding to the at least one text resource in the updated application, wherein the updated application, when built, deployed and run, comprises a first variable identifier which can be enabled to make the subset of the plurality of text resources in the updated application editable from a user interface (UI) of the updated application, and further comprises a second variable identifier which can be enabled to make an entirety of the plurality of text resources in the updated application editable from the (UI) of the updated application;

obtaining source code of the original application;

in response to determining a type of the source code as a programming language, and in response to the information displayed on the at least one text resource in the original application being not editable:

determining an ID of the at least one text resource, and code templates related to the type of the source code which comprise code with editable text resources;

inputting the ID of each text resource of the at least one text resource into the code templates to produce replaced templates;

applying the replaced templates to produce updated source code;

saving the replaced templates in code of the plug-in; and building and deploying the updated source code to produce the updated application.

9. The device according to claim 8, the acts further comprising:

in response to determining a type of the source code as a markup language, and in response to the information displayed on the at least one text resource in the original application being not editable:

determining the ID of the at least one text resource from a markup language page and code templates related to the markup language page which comprise code with editable text resources, inputting the ID of each text resource of the at least one text resource into the related code templates to produce the replaced templates, and adding the replaced templates to the markup language page to produce the updated application which can be directly run in a browser.

10. The device according to claim 9, wherein the markup language is HTML.

11. The device according to claim 8, wherein mapping the second piece of information to the ID of the text resource in a file corresponding to the at least one text resource in the updated application comprises:

creating the file in response to the file not existing.

12. The device according to claim 8, wherein the programing language is Javascript.

13. The device according to claim 8, wherein the updated application comprises a first variable identifier which can be enabled to make all the at least one text resource in the application editable from a user interface (UI) of the application.

14. The device according to claim 8, wherein the updated application comprises a second variable identifier which can be enabled to make a text resource in the application editable from a user interface (UI) of the application.

15. A computer program product being tangibly stored on a non-transient machine-readable medium and comprising machine-executable instructions, the instructions, when executed on a device, causing the device to:

in response to initiation of a plug-in, run an updated application, wherein information displayed on at least one text resource of a plurality of text resources in an original application of the updated application is not editable, and wherein a subset of the plurality of text resources includes the at least one text resource;

in response to a first piece of information displayed on a text resource of the at least one text resource being changed to a second piece of information:
  obtain an ID of the text resource of the at least one text resource in the updated application; and
  map the second piece of information to the ID of the text resource in a file corresponding to the at least one text resource in the updated application, wherein the updated application, when built, deployed and run, comprises a first variable identifier which can be enabled to make the subset of the plurality of text resources in the updated application editable from a user interface (UI) of the updated application, and further comprises a second variable identifier which can be enabled to make an entirety of the plurality of text resources in the updated application editable from the (UI) of the updated application;

obtain source code of the original application;

in response to determining a type of the source code as a programming language, and in response to the information displayed on the at least one text resource in the original application being not editable:
  determine an ID of the at least one text resource, and code templates related to the type of the source code which comprise code with editable text resources;
  input the ID of each text resource of the at least one text resource into the code templates to produce replaced templates;
  apply the replaced templates to produce updated source code;
  save the replaced templates in code of the plug-in; and
  build and deploy the updated source code to produce the updated application.

16. The computer program product according to claim 15, the instructions further casing the device to:
  in response to determining a type of the source code as a markup language, and in response to the information displayed on the at least one text resource in the original application being not editable:
    determine the ID of the at least one text resource from a markup language page and code templates related to the markup language page which comprise code with editable text resources,
    input the ID of each text resource of the at least one text resource into the related code templates to produce the replaced templates, and
    add the replaced templates to the markup language page to produce the updated application which can be directly run in a browser.

17. The computer program product according to claim 15, wherein mapping the second piece of information to the ID of the text resource in a file corresponding to the at least one text resource in the updated application comprises:
  creating the file in response to the file not existing.

18. The computer program product according to claim 15, wherein the programing language is Javascript.

19. The computer program product according to claim 15, wherein the updated application comprises a first variable identifier which can be enabled to make all the at least one text resource in the application editable from a user interface (UI) the application.

20. The computer program product according to claim 15, wherein the updated application comprises a second variable identifier which can be enabled to make a text resource in a user interface (UI) of the application editable from the application.

* * * * *